United States Patent [19]

Cornelius

[11] 4,162,711
[45] Jul. 31, 1979

[54] TRAILER DRIVE APPARATUS

[76] Inventor: Gordon Cornelius, 15231 Jaspar St., N.W., Anoka, Minn. 55303

[21] Appl. No.: 833,091

[22] Filed: Sep. 14, 1977

[51] Int. Cl.² ............................................. B62D 51/04
[52] U.S. Cl. .................................... 180/13; 180/19 S
[58] Field of Search .................. 180/13, 11, 21, 14 R, 180/14 C, 19 R, 19 S; 280/DIG. 11, 476 R; 254/86 R

[56] References Cited

U.S. PATENT DOCUMENTS

| | | | |
|---|---|---|---|
| 3,189,365 | 6/1965 | Blacher | 280/476 R |
| 3,861,483 | 1/1975 | Pavelka | 180/19 S |

Primary Examiner—Joseph F. Peters, Jr.
Assistant Examiner—Donn McGiehan
Attorney, Agent, or Firm—Robert D. Farkas

[57] ABSTRACT

A trailer drive apparatus utilizes a gasoline operated engine carried by a housing supported by a single wheel driven by the output shaft of the engine. The housing is pivotably secured to an upright tubing fastened to a frame. The frame is provided with a ball assembly conventionally used in engaging a trailer hitch apparatus. A strut, of adjustable length, is secured to the upright tube and coupled to a portion of the trailer hitch bar. A handlebar is affixed to the end of a rod passing through the tube thereby permitting the engine housing to be rotated at 360°.

2 Claims, 2 Drawing Figures

TRAILER DRIVE APPARATUS

BACKGROUND OF THE INVENTION

1. The Field of the Invention

This invention relates to trailer drive apparatuses and more particularly to that class of device which is removably coupled to the trailer utilizing a single wheel drive without providing a riding seat for the operator of the device.

2. Description of the Prior Art

The prior art abounds with trailer drive arrangement for utility vehicles useful as a motor drive for trailers. U.S. Pat. No. 3,861,482 issued on Jan. 21, 1975 to W. J. Stephens et al. teaches a motor-driven wheel that is coupled through a rigid support to the front end of a trailer for moving the latter around when the wheel is in driving engagement with the ground. The ground wheel may be raised to an inoperative position off the ground, when desired. One or more springs act between the support and the ground wheel. The ground wheel may be turned to various angular positions with respect to the trailer.

U.S. Pat. No. 3,770,070 issued on Nov. 6, 1973 to J. B. Smith discloses a utility vehicle and vehicle mover that is power propelled, and may be moved by an individual to both lift and transport extremely heavy vehicles, such as trailers, when the vehicle has been disconnected from its prime mover. In one embodiment, the mover includes an adjustable power lifting means that may extend a distance under the trailer tongue for increased stability. In another embodiment, the mover mechanism is integral with the trailer tongue itself.

U.S. Pat. No. 3,861,483 issued on Jan. 21, 1975 to C. C. Pavelka discloses a tractor that has a mobile frame section carrying a hitch for connection with a mobile home or the like and a front section capable of being fully swivelled about its axis. Arching upwardly and forwardly from the mobile frame is a neck that is rigidly connected to a vertically disposed barrel which rotatably mounts a drum associated with the tractor front section. A columnar chassis extends from split axles and entirely through the drum so an upper part can support a motor and pivotally mount a steering mechanism. A differential gear assembly interconnects the split axles that extend from a pair of drive wheels. The steering mechanism is a U-shaped swing bar that can be maneuvered through a broad arc to clear the motor and other components while being swung from one side of the tractor to the other. During turning maneuvers by the tractor the differential gear assembly minimizes skidding and jerkiness tendencies.

All of the prior art suffer the common deficiency of providing a complex apparatus difficult to install to a trailer that is either multi-wheeled or manually operated and generally incapable for operating conveniently at angular locations including 360° so as to facilitate backing-up of the trailer when desired.

SUMMARY OF THE INVENTION

A primary object of the present invention is to provide a trailer drive apparatus which may be operated so as to position the driving wheel contacting the ground at any angular relationship with respect to the trailer hitch bar.

Another object of the present invention is to provide a driving apparatus which is exceedingly small in size and light in weight thereby facilitating convenient storage and handling of the apparatus when not in use.

Still another object of the present invention is to provide a motor driven apparatus which can be adapted to engage a variety of trailer hitches including that type having a trailer hitch bar which is fabricated in bent form.

Yet another object of the present invention is to provide a trailer hitch driving device which can be operated in conjunction with a trailer hitch bar whose ball receiving socket is pitched at any angle relative to the longitudinal axis of the trailer hitch bar itself.

Another object of the present invention is to provide a trailer hitch device which may be conveniently and rapidly assembled to a trailer hitch utilizing a minimum quantity of tools therefor.

Heretofore, utility vehicles fabricated for use with trailers of the type which may be used in camping, carrying boats, recreation vehicles or the like have been fabricated and manufactured which were bulky, inefficient, heavy, difficult to use and otherwise totally ill-suited for the intended purposes. The present invention recognizes these deficiencies and provides an apparatus which may be quickly and easily coupled to a ball receiving trailer hitch and may be fastened to intermediate portions of the length of the trailer hitch bar utilizing a minimum of bolts therefor. The driving motor is geared down so as to be useful in pulling the trailer or other vehicle at slow speeds by way of a small gasoline driven engine mounted to an inexpensively fabricated and lightweight housing. The entire housing, including the ground contacting wheel is rotated simultaneously when it is desired to pull or push the trailer in any desired direction. This facilitates a minimum of moving parts and greatly enhances the simplicity of construction and minimizes maintenance procedures. A pair of outwardly extending handle bars are provided permitting the user to operate the device in walking fashion by staying along side the apparatus or by straddling the proximal end of the trailer hitch. By using a ball-type hitch arrangement coupling of the balance of the apparatus to the trailer is facilitated. A strut bar is provided, which is adjustable in length, thereby permitting the apparatus to be connected to trailer hitches of diverse designs and surely trailer hitches whose outstanding trailer bar is bent. Furthermore, by extending or retracting the strut element, the column defining the access of rotation of the motor housing about which the vehicle is geared, may be tilted from the vertical thereby permitting the height of the ends of the handlebar to be lowered or raised or maintained horizontally, if desired.

DESCRIPTION OF THE PREFERRED EMBODIMENT

Figure 1:
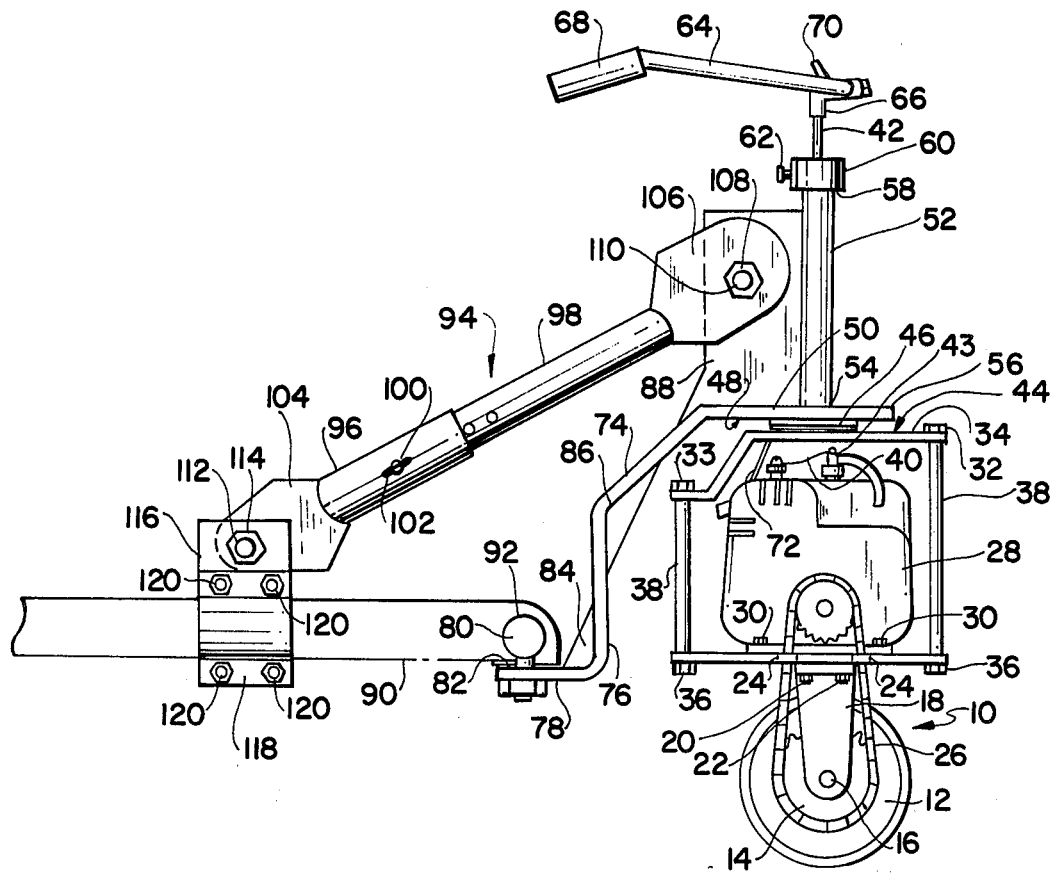
FIG. 1 is a side elevation view of the present invention shown coupled to forwardmost end of a trailer hitch.

The present invention utilizes a single wheel, preferably fabricated from a rubber-like material which is inflated by air and provided with treads around the periphery thereof. The wheel is journaled to rotate about an axis disposed in a horizontal plane. A gear is coaxially aligned and fastened to the wheel. The axle is journaled to a sheet which in turn is fastened to a motor mounting plate residing in a horizontal plane. The motor mounting plate is equipped with at least a pair of holes through which two portions of a bicycle chain pass. The bicycle chain engages the teeth of the gear or sprocket coaxially aligned and fastened to the wheel. The bicycle chain, of the endless variety, is engaged to another sprocket coupled to an output shaft of a gasoline driven engine mounted on the uppermost lateral surface of the motor mounted plate. Four bolts are utilized passing through four hollow tubes so that the lower ends of the bolts pass through holes in the motor mounting plate and are threadingly engaged with nuts engaging the lowermost lateral surface of the mounting plate. An upper plate is joined to the lower plate by resting on the uppermost end of the tube. The bolts pass through the upper plate such that the heads of the bolts clamp onto the uppermost surface of the upper plate thereby causing the tubes to act as spacers maintaining the upper and lower plates in spaced apart relationship. The tubes and bolts are of sufficient length to clear the top of the gasoline operated engine. A washer is caused to reside in touching engagement with the uppermost surface of the upper plate having a rod, whose lowermost end is secured to the uppermost lateral surface of the plate, passing through the opening in the washer. The rod extends substantially vertically and normal to the longitudinal axis of the axle about which the wheel journals. Another tube is caused to reside about a portion of the length of the rod above the washer having a flat sheet fastened to the lowermost end thereof. The flat sheet extends radially outwardly from the rod and the tubes surrounding the rod so as to then extend downwardly and rearwardly having a ball hitch component secured adjacent the end of the sheet and extending upwardly therefrom. The bent-up portion of the sheets are gussetted so as to provide strength to the sheet minimizing the tendencies thereof to bend under a variety of loads exerted on the sheet and the tube to which it is secured. One of the gusset members reside in a vertical plane having a marginal edge thereof secured to the exterior surface of the tube through which the rod is journaled. A hole is provided in this gusset member. A block is provided having a threaded bolt threadingly engaged therein adapted to bear against the rod thereby maintaining the rod in a non-sliding position relative to the tube within, facilitating the ability of the rod to rotate about its longitudinal axis. When the rod rotates, the entire assembly consisting of the upper and lower plates, the bolts and tubes spacing them apart, the engine and wheel assembly-including the bicycle chain coupling them together, rotate simultaneously. A handlebar assembly is secured to the uppermost end of the rod. A throttle is connected through the rod or adjacent thereto and is mounted to the handlebar. A pair of plates, each having a semi-circular bent portion, are fastened together so as to discribe a passageway defined by the bent portions utilizing four bolts therefor. This assembly is adapted to clampingly engage on selected portion of a trailer hitch bar by tightening the bolts joining the bent-up parts together. A hole is located in both plates facilitating the fastening of a spade-plate thereto. This spade plate, in turn, is secured to a hollow tube. The hollow tube engages, in telescoping arrangement, another hollow tube. Both tubes may be secured together at selected locations utilizing holes in the inner tube and holes in the outer tube and a bolt and wing-nut arrangement passing therethrough, in selective locations, so as to adjust the length of the pair of tubes. The inner tube terminates at the non-coupled end to another spade plate similarly provided with a hole adapted to engage the hole of the gusset member attached to the tube within which the rod rotates. Thus, the truss assembly, comprising the telescoping tube, the spade plates and the bent plates may be adjusted in length so as to facilitate the installation of the bent plates on a portion of a bent or formed trailer hitch bar of various sizes. If desired, the telescoping tube may be adjusted in a position whereby the rod and the tube about which the rod and the tube carried thereby may be located at any desired angle away from the vertical thus permitting installation onto the trailer hitch and bar assembly of various styles.

Now referring to the figures, and more particularly to the embodiment illustrated in FIG. 1 showing the present invention 10 having a wheel 12 to which spocket 14 is secured. Axle 16 carries wheel 12 and sprocket 14 in coaxial alignment. Axle 16 is joined to support plate 18 which has its uppermost end fastened to motor mounting plate 20 utilizing bolts 22 therefor. Holes 24, in plate 20 permit bicycle chain 26 to pass therethrough. Gasoline driven engine 28 is shown mounted to the uppermost surface of plate 20 utilizing bolt 30 for this purpose. Bolts 32 pass through opening in upper plate 34 and terminate in nuts 36 at the lowermost surface of plate 20. Bolts 32 have the major portion of their lengths surrounded by hollow tube 38 acting as spacers, spacing apart plate 34 and 20. Tubes 38 and bolts 32 are of sufficient length to facilitate clearing the height of engine 28. Strap 40, well known in the art, may be utilized to ground-off spark plug 43 thereby turning off the operation of engine 28 as desired. Rod 42 has its lowermost end secured to uppermost surface 44 of plate 34, such as by welding. Washer 46 is disposed between surface 44 and lowermost surface 48 of support plate 50. Tube 52 has lowermost end 54 thereof joined securely to uppermost surface 56 of support plate 50. The uppermost end 58 of tube 52 engages block 60. Block 60 is provided with locking bolt 62 whose distal end, not shown, is caused to clamp against rod 42 thereby preventing tube 52 from sliding along the length of rod 42 but not limiting the ability of rod 42 to journal within the confines of tube 52. Handlebar 64 is secured to the uppermost end 66 of rod 42, and is provided with rubber-like gripping handles 68, if desired. Throttle control 70 is secured to handlebar 64 and is coupled to engine 28 by way of throttle control cable 72. Support plate 50 shown having leg 74 extended rearwardly and downwardly from the horizontal surfaces thereof. Leg 74 is coupled to leg 76 residing in a vertical frame and spaced outwardly from tube 38. Leg 78, formed integrally with support bar 50, extends substantially in a horizontal plane and is provided with a spherical ball 80 extending spaced upwardly from uppermost surface 82 thereof. Gussets 84 and 86 are provided so as to prevent bending between legs 78 and 76, and legs 76 and 74 respectively. Gusset 88, in sheet form, is partially secured to leg 84 and to the exterior surface of tube 52. Dotted lines 90 simulate the front portion of a trailer hitch bar provided with opening 92, in spherical hitch form, adapted to receive ball 80 therein. A strut assembly 94 is shown having an outermost tube 96 and an innermost tube 98. Tubes 96 and 98 are arranged to telescope having plurality of openings therein which utilize bolt 100 in conjunction with wing nut 102 so as to facilitate adjustment of the length of strut assembly 94. Spade sheets 104 and 106 are shown connected, as by welding, to the free ends of tube 96 and 98 respectively. Bolt 108 and nut 110 pass through an opening in gusset sheet 88. Bolt 112 and nut 114 are used to attach spade sheet 104 to bent plate 116 by way of an opening therethrough, not shown. Bent plate 118 is joined to bent plate 116 utilizing bolt 120 therefor. Thus, bent plate 116 and 118 may be located at any point along the length of trailer hitch 90 as desired, simply by tightening and loosening bolts 120. This may be accomplished only when tubes 96 and 98 may change their length and by causing spade sheets 104 and 106 to change their angular relationship by pivoting about bolts 112 and 110. Thus, a bent trailer hitch, not shown, may be utilized because ball 80 may rotate within socket 92. When bent plate 116 and 118 are positioned in any position other than shown, tube 98 is repositioned within tube 96 and rod 42 is displaced from the vertical position shown.

Figure 2:
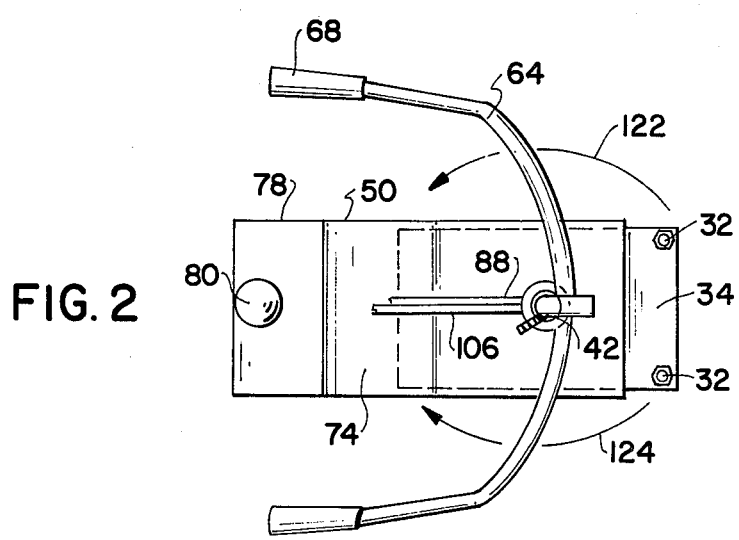
FIG. 2 is a plan view of a portion of the present invention.

FIG. 2 illustrates support plate 50 having leg 78 provided with ball 80 thereabove. Handlebar 64 is shown in a centered position but is capable of being rotated in the direction of arrows 122 or 124 as desired by manual operation of handlebar 64. It should be noted that plates 34 has a length such that it may rotate in conjunction with rod 42 under support plate 50 about 360° of rotation.

One of the advantages of the present invention is to provide a trailer drive apparatus which may be operated so as to position the driving wheel contacting the ground at any angular relationship with respect to the trailer hitch bar.

Another advantage of the present invention is to provide a driving apparatus which is exceedingly small in size and light in weight thereby facilitating convenient storage and handling of the apparatus when not in use.

Still another advantage of the present invention is to provide a motor driven apparatus which can be adapted to engage a variety of trailer hitches including that type having a trailer hitch bar which is fabricated in bent form.

Yet another advantage of the present invention is to provide a trailer hitch driving device which can be operated in conjunction with a trailer hitch bar whose ball receiving socket is pitched at any angle relative to the longitudinal axis of the trailer hitch bar itself.

Another advantage of the present invention is to provide a trailer hitch device which may be conveniently and rapidly assembled to a trailer hitch utilizing a minimum quantity of tools therefor.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows:

I claim:

1. A trailer drive apparatus for connection to a trailer hitch and bar comprising a wheel, a gasoline operated engine, an engine mounting plate, said gasoline operated engine having an output shaft, said output shaft rotationally coupled to said wheel, said wheel journaled to said engine mounting plate, a support plate, means to journal said engine mounting plate to said support plate about a vertical axis, means to removably couple said support plate to the trailer hitch on the hitch bar, a truss, one end of said truss pivotably and lockingly engaged to the trailer hitch bar, means to adjustably and lockingly vary the length of said truss, a rod, a plate, one end of said rod fixedly secured to said plate, said plate fixedly secured to said engine mounting plate in spaced apart relationship, said gasoline operated engine disposed intermediate said engine mounting plate and said plate, a tube, one end of said tube fixedly secured to said support plate, a portion of said rod being journaled within said tube, the other end of said truss pivotably and lockingly secured to said tube, a handlebar, said handlebar fixedly secured to the other end of said rod, wherein said support plate extends outwardly from the exterior portion of said gasoline operated engine and downwardly therefrom whereby said gasoline operated engine may be rotated 360° and whereby rotating said handlebar manually causes said motor mounting plate to rotate said 360°.

2. The apparatus as claimed in claim 1 wherein said means to removably couple comprises a ball, said ball secured to an upper surface of said support plate, said ball being removably secured within a spherical opening in said trailer hitch.

* * * * *